United States Patent
Kim

(10) Patent No.: US 10,452,685 B2
(45) Date of Patent: Oct. 22, 2019

(54) METHOD AND APPARATUS FOR REPLICATING DATA

(71) Applicant: Machbase Inc., Seoul (KR)

(72) Inventor: Sung Jin Kim, Seoul (KR)

(73) Assignee: MACHBASE INC., Seoul (KR)

( * ) Notice: Subject to any disclaimer, the term of this patent is extended or adjusted under 35 U.S.C. 154(b) by 221 days.

(21) Appl. No.: 15/607,038

(22) Filed: May 26, 2017

(65) Prior Publication Data

US 2017/0344619 A1 Nov. 30, 2017

(30) Foreign Application Priority Data

May 30, 2016 (KR) ........................ 10-2016-0066375

(51) Int. Cl.
| | |
|---|---|
| *G06F 11/14* | (2006.01) |
| *G06F 16/21* | (2019.01) |
| *G06F 16/27* | (2019.01) |
| *G06F 16/35* | (2019.01) |
| *G06F 16/951* | (2019.01) |

(52) U.S. Cl.
CPC .......... *G06F 16/275* (2019.01); *G06F 16/214* (2019.01); *G06F 16/27* (2019.01); *G06F 16/355* (2019.01); *G06F 11/1471* (2013.01); *G06F 16/951* (2019.01)

(58) Field of Classification Search
CPC .... G06F 16/275; G06F 16/355; G06F 16/214; G06F 16/27; G06F 16/951; G06F 11/1471
See application file for complete search history.

(56) References Cited

U.S. PATENT DOCUMENTS

| | | | | |
|---|---|---|---|---|
| 8,965,849 B1* | 2/2015 | Goo | ..................... | G06F 16/2246 707/634 |
| 2014/0279855 A1* | 9/2014 | Tan | ..................... | G06F 16/2228 707/609 |
| 2014/0344236 A1 | 11/2014 | Xiao et al. | | |
| 2015/0169655 A1 | 6/2015 | Gupta | | |
| 2015/0169658 A1 | 6/2015 | Goo | | |
| 2016/0077936 A1* | 3/2016 | Tang | ..................... | G06F 11/2028 714/4.11 |

(Continued)

FOREIGN PATENT DOCUMENTS

| | | |
|---|---|---|
| JP | 2000-259482 A | 9/2000 |
| KR | 10-1331350 B1 | 11/2013 |

OTHER PUBLICATIONS

Fangjin Yang, et al. "Druid: A Real-Time Analytical Data Store". Proceedings of the 2014 ACM Sigmod International Conference on Management of Data, Sigmod '14, pp. 157-168. Jun. 22, 2014. XP055389304, New York, NY, USA. DOI: 10.1145/2588555.2595632. ISBN: 978-1-4503-2376-5.

(Continued)

*Primary Examiner* — Jorge A Casanova
(74) *Attorney, Agent, or Firm* — Novick, Kim & Lee, PLLC; Sang Ho Lee

(57) ABSTRACT

Provided herein are a method and an apparatus for replicating data. A master node or a data node stores data and indices in a table region including a plurality of data regions and a plurality of index regions, merges the plurality of index regions with one another to be one index region, and then replicates a table region including the plurality of data regions and the one index region to other nodes.

11 Claims, 6 Drawing Sheets

(56) References Cited

U.S. PATENT DOCUMENTS

2016/0378653 A1* 12/2016 Lu .................. G06F 12/0866
  711/143

OTHER PUBLICATIONS

Ilya Grigorik: "SSTable and Log Structured Storage: LevelDB—igvita.com". Feb. 6, 2012. XP055389311, Retrieved from the Internet. URL: https://www.igvita.com/2012/02/06/sstable-and-log-structured-storage-leveldb/ [retrieved on Jul. 10, 2017].

* cited by examiner

METHOD AND APPARATUS FOR REPLICATING DATA

CROSS-REFERENCE TO RELATED APPLICATION

This application claims the priority and benefit of Korean Patent Application No. 10-2016-0066375 filed on May 30, 2016, with the Korean Intellectual Property Office, the disclosure of which is incorporated herein by reference.

BACKGROUND OF THE INVENTION

1. Field of the Invention

The present invention relates to a method and an apparatus for replicating data of a database in a multi-node environment.

2. Description of the Related Art

Various data generated from sensors and equipments are generated in a time series form, and a database storing and analyzing these time series data in real time therein is called a time series database.

Generally, in the time series database, a change, that is, an updating operation, of the stored data is hardly generated, and only an operation such as insertion, deletion, or selection, or the like, of the data is mainly generated.

The time series database replicates and stores the stored data to and in one or more other places in order to prevent loss of the data due to a defect, or the like, and in the case in which one time series database performs all of reception, replication, and the like, of the time series data, a load is concentrated, such that a problem of deterioration of performance such as a reduction in a data processing speed, or the like, occurs.

SUMMARY OF THE INVENTION

An object of the present invention is to provide a method and an apparatus for replicating data capable of preventing a load from being concentrated on a specific node of a database and reducing a time required for replication.

According to an exemplary embodiment of the present invention, a method for replicating data of a time series database including a master node and one or more data nodes, performed a node apparatus constituting a database system, comprising: toring data and indices in a table region including a plurality of data regions and a plurality of index regions; merging the plurality of index regions with one another to be one index region; and replicating a table region including the plurality of data regions and the one index region to other nodes.

According to another exemplary embodiment of the present invention, a node apparatus of a database may include: a data receiving unit receiving data; a data storing unit storing data and indices in a table region including a plurality of data regions and a plurality of index regions; and a replicating unit merging the plurality of index regions with one another to be one index region and replicating a table region including the plurality of data regions and the one index region to other nodes.

DETAILED DESCRIPTION

Hereinafter, a method and an apparatus for replicating data according to an exemplary embodiment of the present invention will be described in detail with reference to the accompanying drawings.

Figure 1:
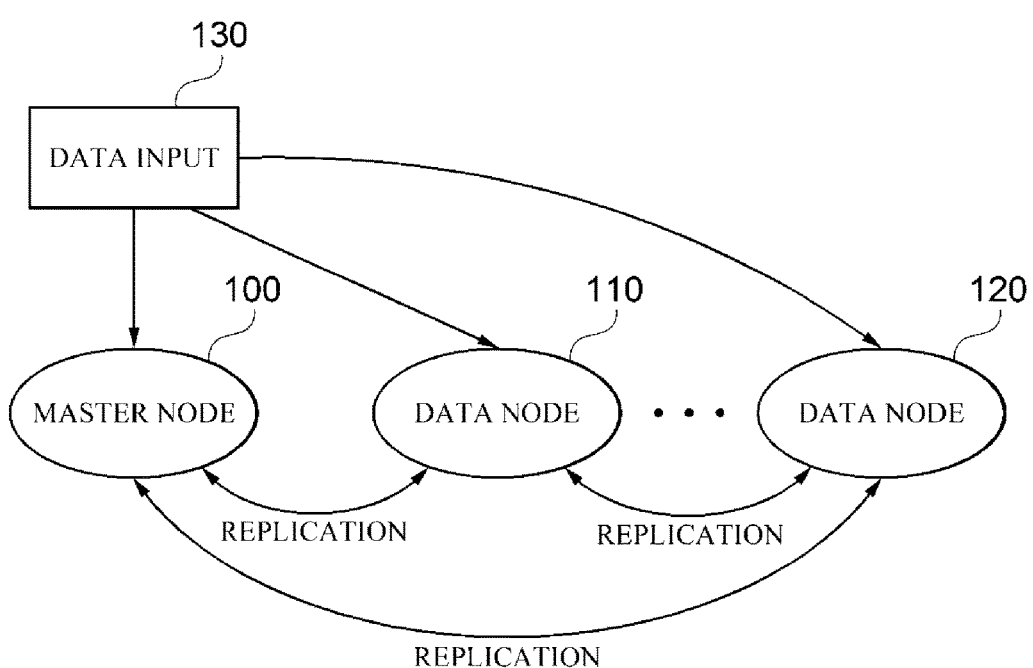
FIG. 1 is a view illustrating an example of a database system including a plurality of nodes according to an exemplary embodiment of the present invention.

FIG. 1 is a view illustrating an example of a database system including a plurality of nodes according to an exemplary embodiment of the present invention.

Referring to FIG. 1, the database system includes a master node 100 and one or more data nodes 110 and 120. Each of the master node 100 and the data nodes 110 and 120 receives allocated tables and store data, and replicates input data to other nodes when a predetermined amount of input data is accumulated.

The present exemplary embodiment may be applied to a time series database storing time series data therein. In this case, since an updating process of the database hardly takes place, a plurality of index files are merged with one another to reduce input/output (I/O) overheads of files, thereby making it possible to perform rapid replication.

In addition, relation identifiers (RIDs) having a form in which they are sequentially increased or decreased depending on a time may be granted to the data according to the present exemplary embodiment. For example, the relation identifiers may be generated on the basis of a time such as a year, a month, a data, a time, a minute, a second (a nano-second), or the like.

Figure 2:
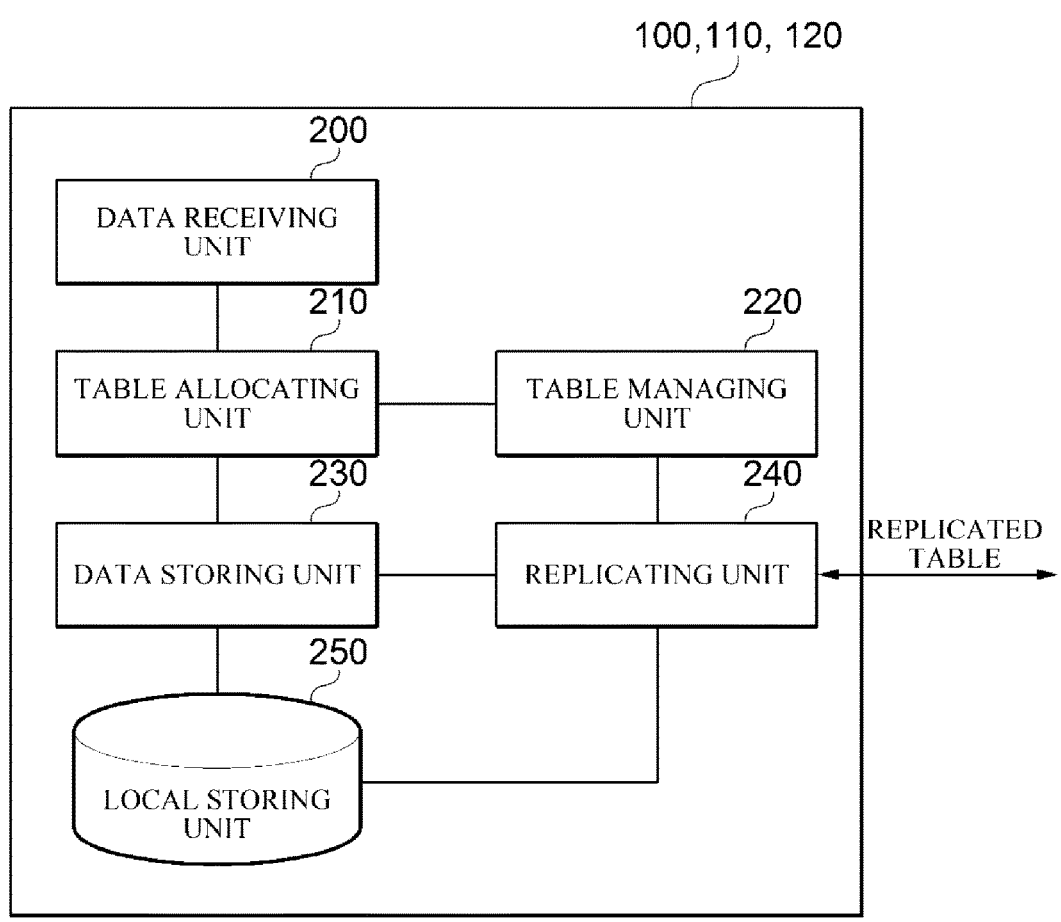
FIG. 2 is a view illustrating a configuration of an example of a node constituting the database system according to an exemplary embodiment of the present invention.

FIG. 2 is a view illustrating a configuration of an example of a node constituting the database system according to an exemplary embodiment of the present invention.

Referring to FIG. 2, the master node 100 or each of the data nodes 110 and 120 includes a data receiving unit 200, a table allocating unit 210, a table managing unit 220, a data storing unit 230, a replicating unit 240, and a local storing unit 250.

The data receiving unit 200 receives data from an external device.

The table allocating unit 210 receives allocated table regions from the table managing unit 220.

The table managing unit 220 has information on nodes to which the respective tables are allocated. For example, a content that first and third tables are allocated to the master node, second and fourth tables are allocated to a first data node, and fifth and sixth tables are allocated to a second data node is preset in the table managing unit 220.

According to an exemplary embodiment, the table managing unit 220 may be present in only the master node 100. In this case, the table allocating units 210 of the data nodes 110 and 120 may request the table managing unit 220 of the master node 100 to allocate tables, and may receive the allocated tables. As another example, all of the respective data nodes 110 and 120 as well as the master node 100 may include the table managing units 220 including the same table allocation information.

The data storing unit 230 may store the data in the table region allocated by the table allocating unit 210. A general table in which the data are stored includes a plurality of data regions and a plurality of index regions. The respective data regions include the respective data files, and the respective index regions include the respective index files.

Figure 3:
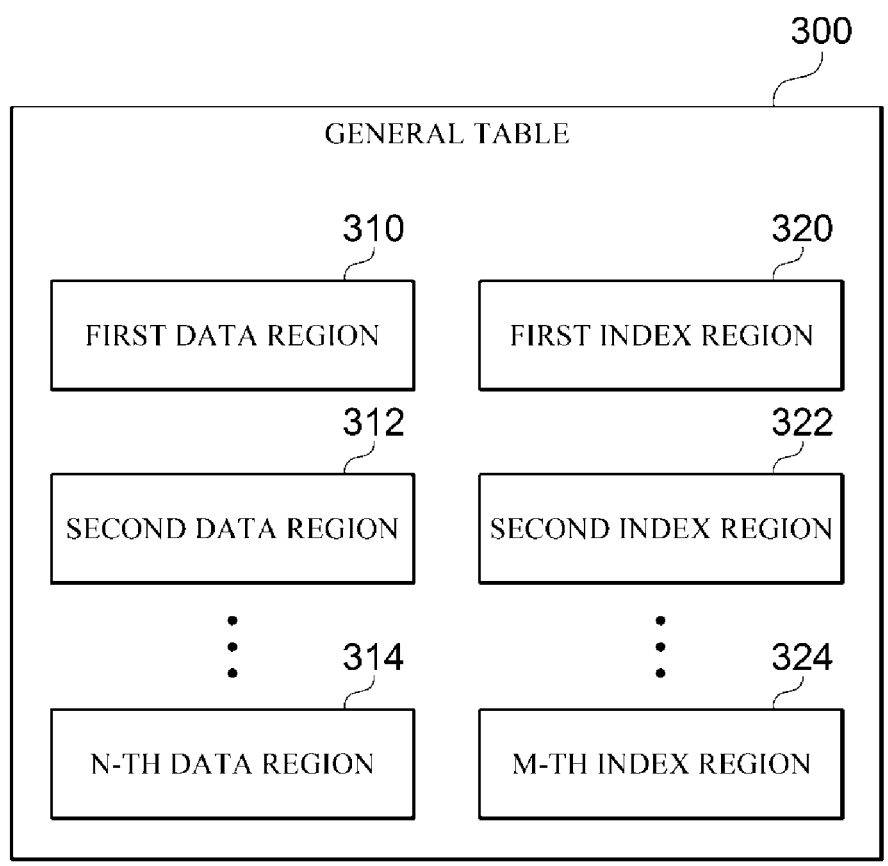
FIG. 3 is a view illustrating an example of a general table according to an exemplary embodiment of the present invention.

The data storing unit 230 stores data in the data regions, and stores various index information including positions in which the corresponding data are stored in the index regions. An example of the general table in which the data are stored is illustrated in FIG. 3.

When data having a predetermined size or more are stored in the table, the replicating unit 240 replicates data stored in the local storing unit 250 to other nodes. Target nodes to which the table is to be replicated may be dynamically or statically allocated by various methods, and it is assumed that replication target nodes of tables for each node are preset in the present exemplary embodiment.

When the replicating unit 240 replicates the data to other nodes, the replicating unit 240 does not replicate the data using the general table itself stored in the local storing unit, but merges a plurality of index regions present in the table with one another to be one region and performs replication using one region.

Figure 4:
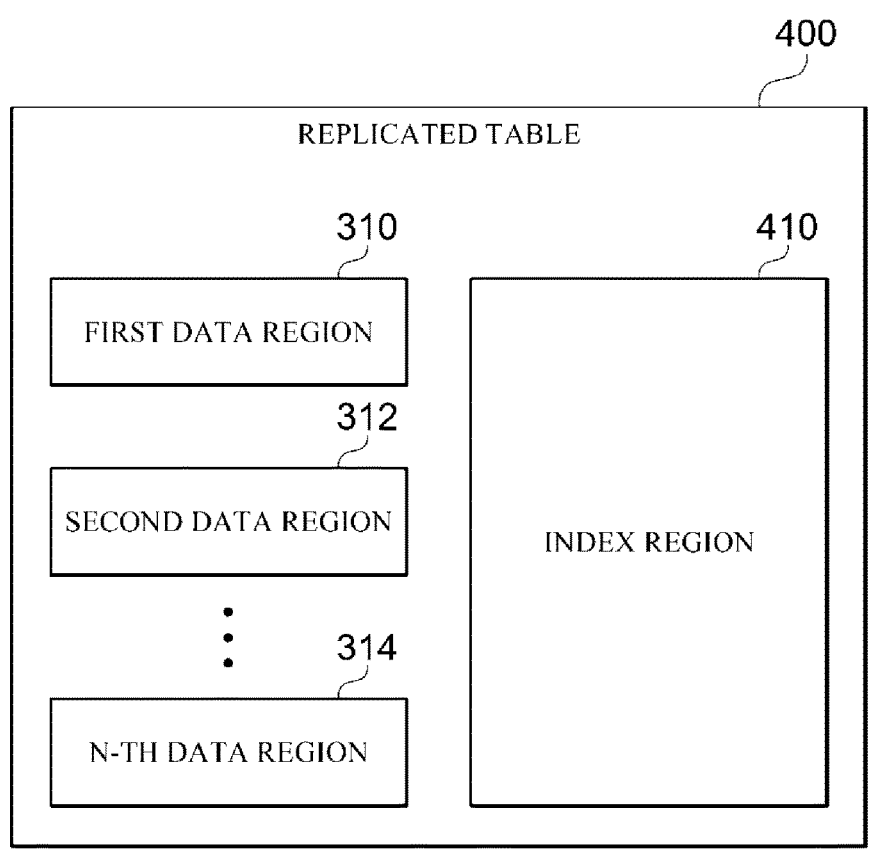
FIG. 4 is a view illustrating an example of a replicated table according to an exemplary embodiment of the present invention.

In other words, the replicating unit 240 merges a plurality of index files with one another to be one index file, and replicates data of the respective data regions using the merged one index file, thereby making it possible to reduce I/O overheads. An example of a replicated table in which index regions are merged with one another is illustrated in FIG. 4. A method for merging the index regions with one another will be again described with reference to FIG. 5. The replicating unit 240 may receive the replicated table from other nodes, and store the replicated table in the local storing unit 250.

The local storing unit 250 includes the general table 300 as illustrated in FIG. 3 storing the received data therein, and the replicated table 400 as illustrated in FIG. 4 transferred from other nodes.

FIG. 3 is a view illustrating an example of a general table according to an exemplary embodiment of the present invention.

Referring to FIG. 3, the general table storing data received by each node therein includes a plurality of data regions 310, 312, and 314, and a plurality of index regions 320, 322, and 324. Although a region is described for convenience of explanation in the present exemplary embodiment, the respective data regions 310, 312, and 314 and the respective index regions 320, 322, and 324 include the respective files, which is also similar in the following exemplary embodiments. The respective index regions may be generated as log structured merge (LSM)-tree index files.

Since the respective data regions 310, 312, and 314 have predetermined sizes, the numbers of data included in the respective data regions may be different from each other depending on sizes of data stored in the respective data regions 310, 312, and 314. On the other hand, the index regions 320, 322, and 324 include a predetermined number of indices.

Therefore, a relation between the data regions 310, 312, and 314 and the index regions 320, 322, and 324 may not be a one-to-one relation depending on the sizes of the data stored in the respective data regions 310, 312, and 314. For example, sizes of a first data region 310 and a second data region 312 are the same as each other, but sizes of data stored in the respective data regions are different from each other, such that twenty data may be stored in the first data region 310 and ten data may be stored in the second data region 312. When the respective index regions store ten indices therein, a first index region 320 stores indices for ten data stored in the first data region 310 therein, and a second index region 322 stores indices for the other ten data stored in the first data region 310 therein.

In such a case, a reference to each of files corresponding to the first index region 320 and files corresponding to the second index region 322 should be made in order to replicate data of the first data region, and I/O overheads of index files are thus generated. When the number of index regions is 1000, a reference to at least 1000 index files should be made in order to replicate data.

Therefore, in the present exemplary embodiment, the general table of FIG. 3 is not replicated as it is, but replication is performed using the replicated table of FIG. 4.

FIG. 4 is a view illustrating an example of a replicated table according to an exemplary embodiment of the present invention.

Referring to FIG. 4, the replicated table 400 includes a plurality of data regions 310, 312, and 314, and an index region 410. The plurality of data regions 310, 312, and 314 are the same as the plurality of data regions described above with reference to FIG. 3.

The index region 410 is one region obtained by merging the plurality of index regions 320, 322, and 324 of FIG. 3 with one another. That is, the index region 410 is obtained by merging the plurality of index files of FIG. 3 with one another to be one file. However, merging among the index regions 320, 322, and 324 of FIG. 3 is not merging for making files only one file as in merging among general documents, but merging between index regions configured in a bitmap form as illustrated in FIG. 5 in order to reduce a time required for the replication.

Figure 5:
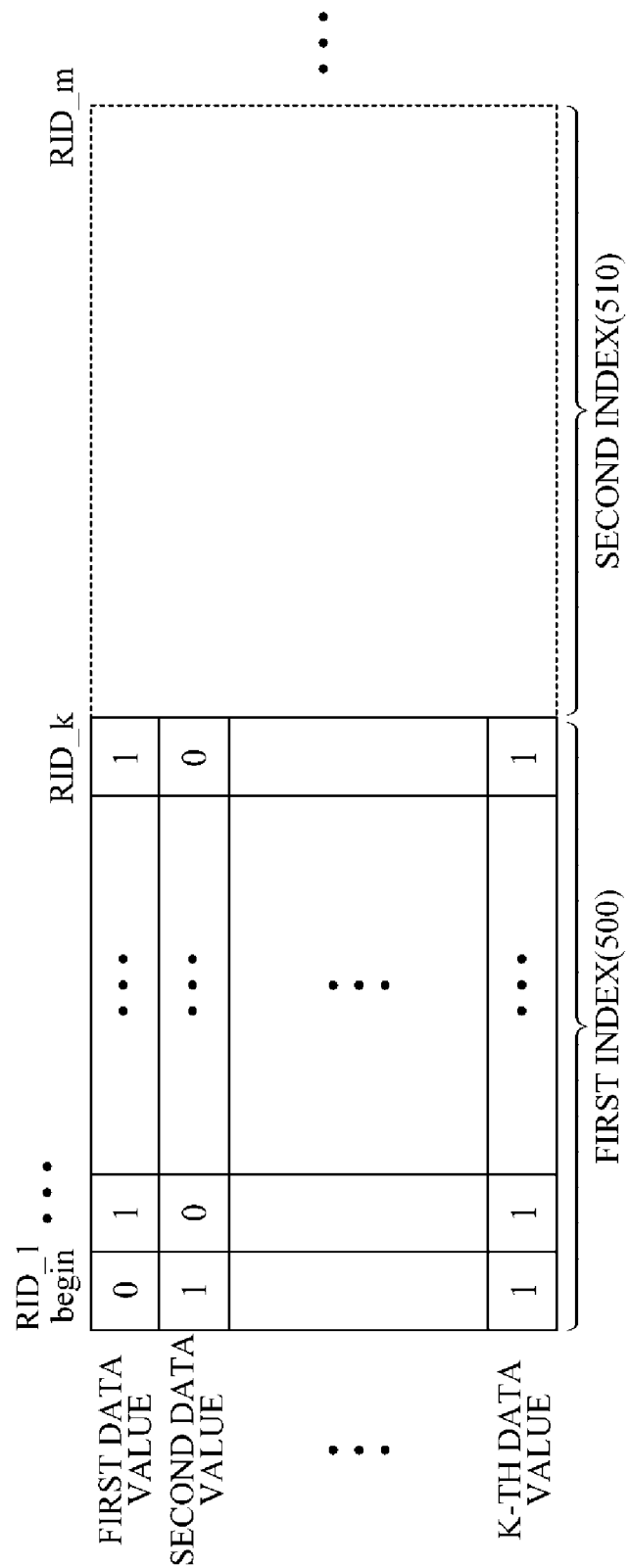
FIG. 5 is a view illustrating an example of merging bitmap indices with each other according to an exemplary embodiment of the present invention.

FIG. 5 is a view illustrating an example of merging bitmap indices with each other according to an exemplary embodiment of the present invention.

Referring to FIG. 5, the indices included in the respective index regions 320, 322, and 324 of FIG. 3 are bitmap indices 500 and 510. The bitmap indices 500 and 510 are formed of a matrix of data values and the respective relation identifiers, and the respective elements have a value of 0 or 1 indicating whether or not data are present.

Since data have relation identifiers having a form in which they are sequentially increased or decreased depending on a time, when the bitmap indices 500 and 510 stored in the respective index regions are merged with each other, the bitmap indices 500 and 510 may be merged with each other to be one bitmap index 500 by extending a relation identifier section. For example, in the case in which a relation identifier section stored in the first bitmap index 500 is RID_1 to RID_k and a relation identifier section stored in the second bitmap index 510 is RID_(k+1) to RID_m, these two bitmap indices may be merged with each other by making columns of a bitmap index RID_1 to RID_m.

Figure 6:
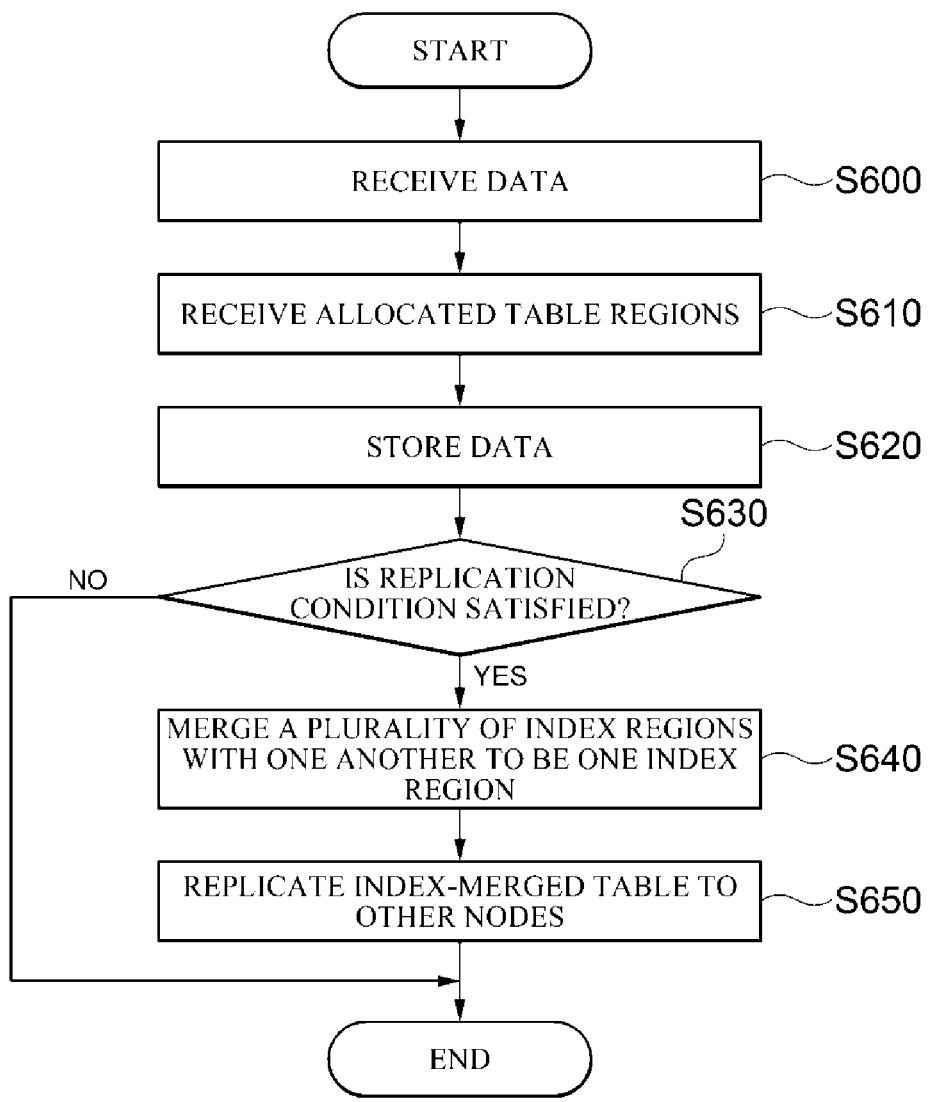
FIG. 6 is a flow chart illustrating an example of a method for replicating data according to an exemplary embodiment of the present invention.

FIG. 6 is a flow chart illustrating an example of a method for replicating data according to an exemplary embodiment of the present invention.

Referring to FIG. 6, an apparatus (hereinafter, referred to as a 'node apparatus') of the master node or the data node constituting the database system receives the data (S600). The node apparatus receives the allocated table regions and stores the data (S610 and S620). The node apparatus stores the data using the general table including the plurality of data regions and the plurality of index regions described above with reference to FIG. 3.

The node apparatus figures out whether or not a replication condition is satisfied (S630). The replication condition may be variously preset depending on an exemplary embodiment. As an example, it may be figured out that the replication condition is satisfied when a data having a predetermined size or more are accumulated in the table.

The node apparatus merges the plurality of index regions with one another to be one region as illustrated in FIG. 4 in order to replicate the data (S640). In addition, the data are replicated to other nodes using a table merged to be one index region (S650). In this case, the node apparatus does not individually confirm index files for the respective data regions, but uses one merged index file to reduce the I/O overheads of the index files at the time of replicating the data, thereby making it possible to more rapidly perform the replication.

The method for replicating data according to an exemplary embodiment of the present invention may be implemented as a computer readable code in a computer readable recording medium. The computer readable recording medium may include all kinds of recording apparatuses in which data that may be read by a computer system are stored. An example of the computer readable recording medium may include a read only memory (ROM), a random access memory (RAM), a compact disk read only memory (CD-ROM), a magnetic tape, a floppy disk, an optical data storage, or the like. In addition, the computer readable recording media may be distributed in computer systems connected to each other through a network, such that the computer readable codes may be stored and executed in the computer readable recording media in a distributed scheme.

According to the present invention, a plurality of nodes store data in a distributed form, thereby making it possible to distribute a load of the database system. In addition, when a predetermined amount of data are accumulated, the respective nodes make index files one file and then perform replication when they replicate the data to other nodes, thereby making it possible to reduce a time required for the replication.

Hereinabove, the present invention has been described with reference to exemplary embodiments. It will be understood by those skilled in the art to which the present invention pertains that the present invention may be implemented in a modified form without departing from essential characteristics of the present invention. Therefore, exemplary embodiments disclosed herein should be considered in an illustrative aspect rather than a restrictive aspect. The scope of the present invention should be defined by the claims rather than the above-mentioned description, and equivalents to the claims should be interpreted to fall within the present invention.

What is claimed is:

1. A method for replicating data of a time series database including a master node and one or more data nodes, performed by a node apparatus constituting a database system, comprising:
   storing data and indices in a table region including a plurality of data regions and a plurality of index regions;
   merging the plurality of index regions with one another to be one index region; and
   replicating a table region including the plurality of data regions and the one index region to other nodes,
   wherein the merging is performed by modifying a relation identifier so as to indicate the plurality of index regions, and
   the replicating is performed by using the relation identifier indicating the plurality of index regions.

2. The method for replicating data of claim 1, wherein the storing includes:
   allocating the table region; and
   storing the data and the indices in the allocated table region.

3. The method for replicating data of claim 1, wherein the indices include information in a bitmap form on positions in which the data are stored and on data values.

4. The method for replicating data of claim 3, wherein the merging includes merging bitmaps stored in each of the plurality of index regions with one another to be one bitmap and storing the one bitmap in one index region.

5. The method for replicating data of claim 1, wherein the respective indices stored in the plurality of index regions are log structured merge tree (LSMT) indices.

6. A node apparatus of a database, comprising:
   a data receiving unit receiving data;
   a data storing unit storing data and indices in a table region including a plurality of data regions and a plurality of index regions; and
   a replicating unit merging the plurality of index regions with one another to be one index region and replicating a table region including the plurality of data regions and the one index region to other nodes,
   wherein the merging is performed by modifying a relation identifier so as to indicate the plurality of index regions, and
   the replicating is performed by using the relation identifier indicating the plurality of index regions.

7. A computer-readable non-transitory recording medium in which programs for performing a method for replicating data by a node apparatus constituting a database system in a time series database including a master node and one or more data nodes are recorded, the method for replicating data including:
   storing data and indices in a table region including a plurality of data regions and a plurality of index regions;
   merging the plurality of index regions with each other to be one index region; and
   replicating a table region including the plurality of data regions and the one index region to other nodes,
   wherein the merging is performed by modifying a relation identifier so as to indicate the plurality of index regions, and
   the replicating is performed by using the relation identifier indicating the plurality of index regions.

8. The computer-readable non-transitory recording medium of claim 7, wherein the storing includes:
   allocating the table region; and
   storing the data and the indices in the allocated table region.

9. The computer-readable non-transitory recording medium of claim 7, wherein the indices include information in a bitmap form on positions in which the data are stored and on data values.

10. The computer-readable non-transitory recording medium of claim 9, wherein the merging includes merging bitmaps stored in each of the plurality of index regions with one another to be one bitmap and storing the one bitmap in one index region.

11. The computer-readable non-transitory recording medium of claim 7, wherein the respective indices stored in the plurality of index regions are LSMT indices.

* * * * *